(12) United States Patent
Baumgartner et al.

(10) Patent No.: US 6,722,479 B2
(45) Date of Patent: *Apr. 20, 2004

(54) WHEEL AND/OR BRAKE DISK HUB AND BRAKE DISK

(75) Inventors: Hans Baumgartner, Moosburg (DE); Wolfgang Pahle, Heilbronn (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/251,976

(22) Filed: Sep. 23, 2002

(65) Prior Publication Data

US 2003/0066715 A1 Apr. 10, 2003

Related U.S. Application Data

(63) Continuation of application No. 09/786,270, filed as application No. PCT/EP99/06070 on Aug. 19, 1999, now Pat. No. 6,467,588.

(30) Foreign Application Priority Data

Sep. 2, 1998 (DE) .......................................... 198 39 763

(51) Int. Cl.$^7$ ............................................. F16D 65/12
(52) U.S. Cl. .............................. 188/218 XL; 188/18 A
(58) Field of Search .......................... 188/218, 218 R, 188/18 A

(56) References Cited

U.S. PATENT DOCUMENTS

| 5,360,087 | A | | 11/1994 | Wiebelhaus et al. |
| 6,035,978 | A | * | 3/2000 | Metzen et al. ........ 188/218 XL |
| 6,073,735 | A | * | 6/2000 | Botsch et al. ......... 188/218 XL |
| 6,135,247 | A | * | 10/2000 | Bodin et al. .......... 188/218 XL |
| 6,152,270 | A | * | 11/2000 | Giorgetti .............. 188/218 XL |
| 6,467,588 | B1 | * | 10/2002 | Baumgartner et al. ...... 188/218 XL |

FOREIGN PATENT DOCUMENTS

| DE | 3216108 | * 12/1982 | ........... 188/218 XL |
| DE | 3441304 | 5/1985 | |
| DE | 19544559 | 7/1997 | |
| DE | 19726674 | 1/1998 | |
| DE | 19751522 | 6/1999 | |
| DE | 19807184 | 4/2000 | |

* cited by examiner

*Primary Examiner*—Matthew C. Graham
(74) *Attorney, Agent, or Firm*—Crowell & Moring LLP

(57) ABSTRACT

The invention relates to a wheel and/or brake disk hub (2) for receiving a one-piece or multi-piece, and notably fragmented, brake disk (1) having friction rings (5, 6) which are preferably connected via links (7). Said hub is configured such that cams (15) of the hub (2) have shoulders (22) which protrude radially outwards and on one side axially secure the brake disk (1) positioned on the hub (2). The brake disk is axially stepped at its inner periphery in such a way that a step (6') is formed which is supported on the shoulder (22).

14 Claims, 4 Drawing Sheets

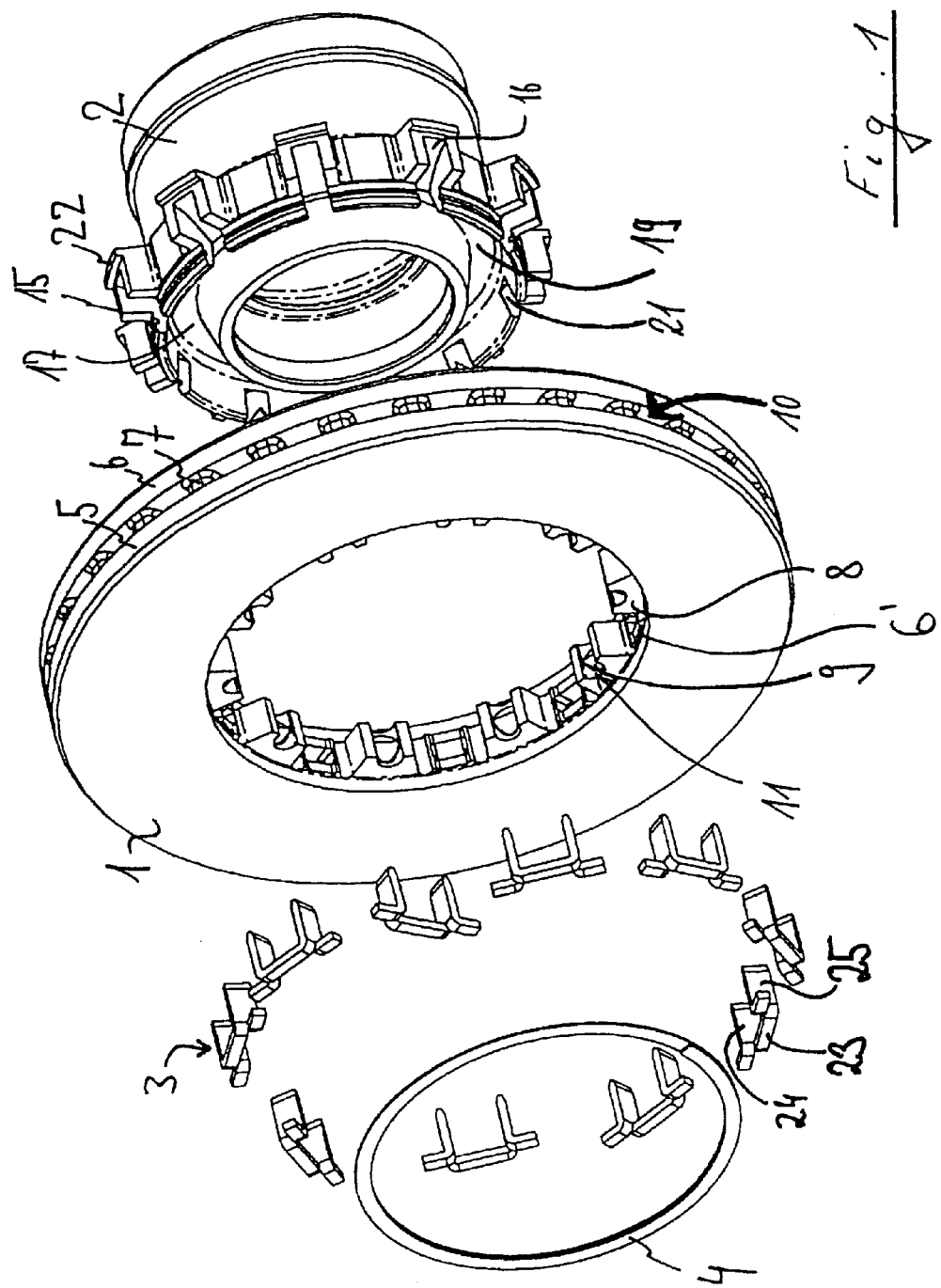

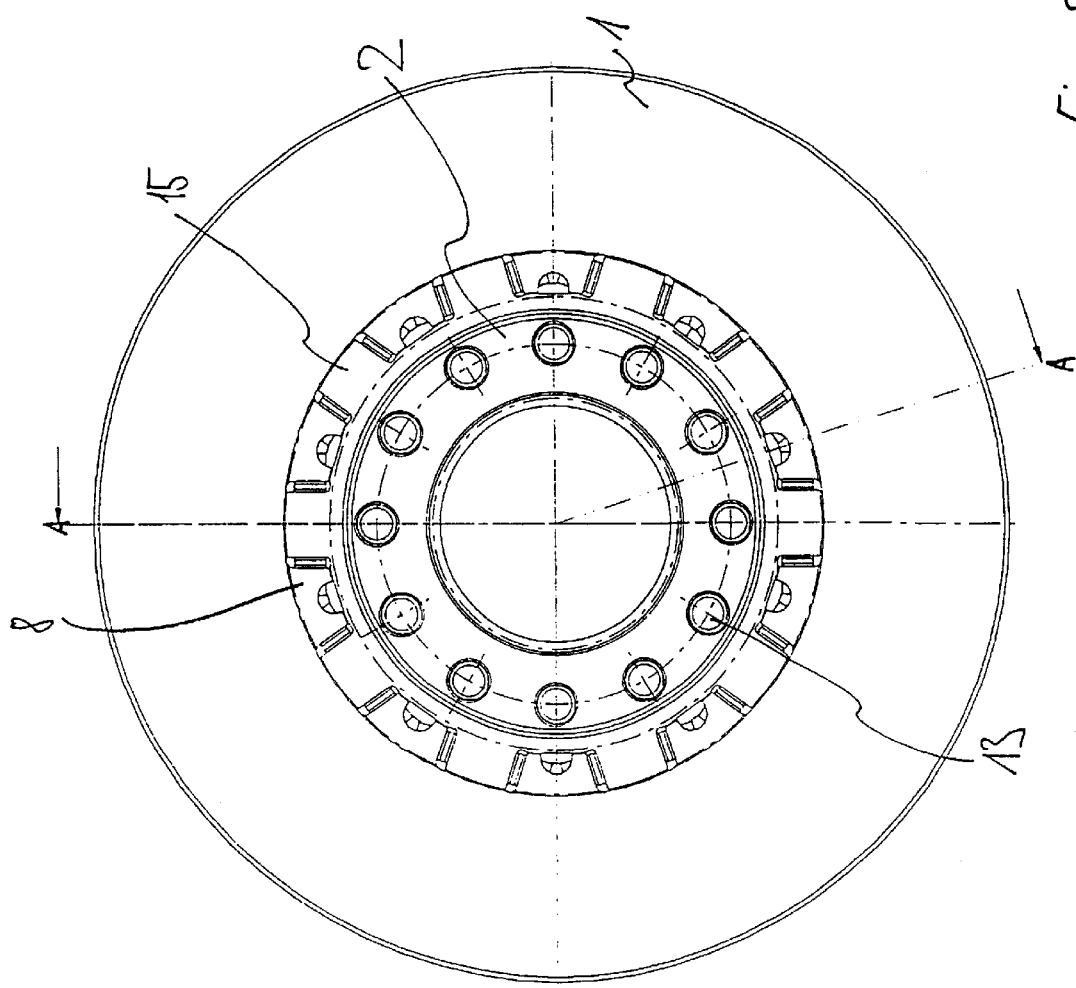

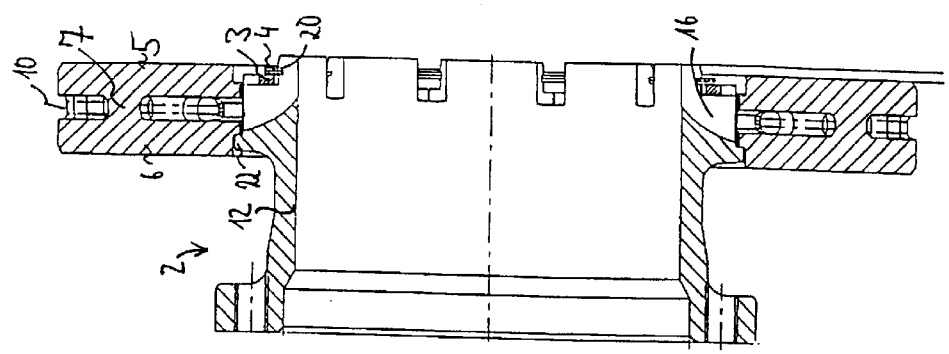
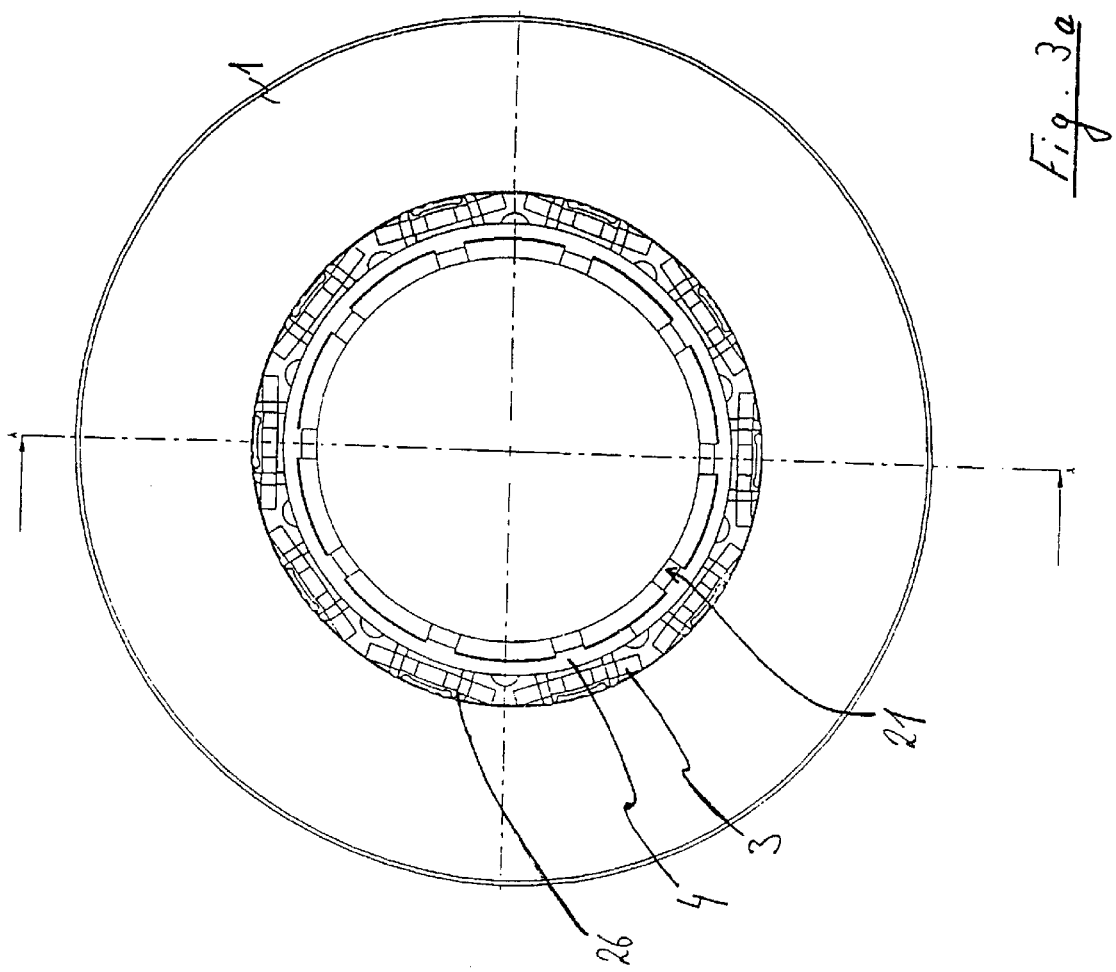

WHEEL AND/OR BRAKE DISK HUB AND BRAKE DISK

This application is a continuation of Ser. No. 09/786,270 filed Aug. 2, 2001 now U.S. Pat. No. 6,467,588, which is a 371 of PCT/EP99/06070 filed Aug. 19, 1999.

BACKGROUND AND SUMMARY OF THE INVENTION

The invention relates to a wheel and/or brake disk hub for a brake disk for commercial vehicles and to a brake disk.

An internally ventilated brake disk with two friction rings in addition to the pertaining hub is known from German patent document DE 195 44 559 C1. For connecting the brake disk with the hub, in the case of this brake disk, intermediate elements are provided for the torque and power transmission from the cam of the hub to the supporting elements of the disk, which can be fastened on the cams of the hub, for example, by means of bolts. In this case, on the one hand, the cams of the hub engage in the intermediate elements and, on the other hand, the intermediate elements engage in the supporting elements, so that a reliable torque transmission is ensured from the brake disk to the hub in both rotating directions.

The brake disk of German patent document DE 195 44 559 C1 was found to be useful, but a further simplified assembly with low costs for manufacturing and material is desirable. During the assembly, a screwed connection, which is susceptible to rust should preferably be avoided and a good axial fit of the brake disk on the hub should be ensured.

A brake disk and a wheel hub of the above-mentioned type are known from German patent document DE 197 26 674 A1, in which case the axial securing takes place by rings engaging in grooves of the hub. These rings can also be constructed in one piece with the hub.

Based on this prior art, it is an object of the invention to ensure a particularly good ventilation of the brake disk while the assembly of the brake disk is further simplified.

The invention achieves this goal by means of the objects of the independent claims.

The present invention uses a different method than the prior art in that it provides a wheel and/or brake disk hub for receiving a one-piece or multi-piece, and particularly fragmented, brake disk having friction rings, which are preferably connected by way of links. A disk/hub connection for connecting the brake disk with the hub is provided, which is constructed as follows: the brake disk has supporting elements at its inner peripheral area; the hub is equipped with cams at the outer peripheral area; intermediate elements, which are arranged in a distributed manner in the peripheral direction and preferably have a U-shaped construction are provided radially between the hub and the brake disk, which intermediate elements preferably have a base section and two longitudinal sections which are essentially constructed perpendicular to the base section. In this case, the intermediate elements are also placed from one side of the brake disk axially over the cams or supporting elements such that the longitudinal sections project into spaces extending in the peripheral direction between the cams and the supporting elements, and therefore ensure a transmission of the braking torque from the brake disk to the hub. At least one of the cams of the hub is provided with a shoulder which projects radially to the outside and which axially secures toward one side the brake disk placed on the hub. The shoulder interacts with a projection of the brake disk which is formed by a stepped surface on the inner periphery of the brake disk.

The invention therefore implements a disk/hub connection which can be assembled and disassembled extremely easily because no screwed connections are provided. Even after an extended operation under high stress, it is still easily possible to demount the brake disk from the wheel hub. Furthermore, the axial fixing devices, i.e., the "shoulder at the cam" and the "stepped inner periphery of the brake disk", can be shaped out during the manufacturing of the hub and the brake disk so that separate fastening devices are eliminated for at least one of the two axial directions. Therefore, the at least one shoulder is therefore shaped in one piece to the axial end areas of the cams.

The cams of the hub are advantageously provided with air ducts which, starting axially from the axial exterior sides of the cams, lead into an air duct between the friction rings of the brake disk. In comparison to the prior art of the above-mentioned type, this improves the cooling of the brake disk because it implements an increased air supply from the hub interior into the air gap of the internally ventilated brake disk.

Another embodiment of the invention is characterized in that a (spring) ring, which can be inserted into a surrounding groove, is provided as another axial securing device or as a securing device in the other axial direction, which (spring) ring projects radially from the groove toward the outside. This axial fixing is also particularly cost-effective and is easy to mount.

The invention also implements a one-piece or multi-piece, preferably internally ventilated, brake disk with friction rings which are connected by way of links and which can be placed on a hub. In this case steps 6', which are molded on radially toward the interior, are provided on the inner periphery of the brake disk in the area of spaces between the supporting elements, which steps (6') are designed for resting against the shoulders (22) of the cams (15) of the hub (29) which are shaped out in one piece.

Additional advantageous variants of the invention are contained in the other subclaims.

In the following, the invention will be explained in detail by means of embodiments with reference to the drawings.

BRIEF DESCRIPTION OF THE DRAWINGS

FIG. 1 is an exploded view of a brake disk/hub connection according to the invention;

FIG. 2a is a top view of the embodiment of the invention according to FIG. 1 in the mounted condition;

FIG. 2b is a sectional view along Line A—A of FIG. 2a;

FIG. 2c is a rear view of the embodiment of FIG. 2a;

FIG. 3a is a top view of another embodiment of the invention; and

FIG. 3b is a sectional view along line A—A of the embodiment of FIG. 3a.

DETAILED DESCRIPTION OF THE DRAWINGS

Figure 2B:
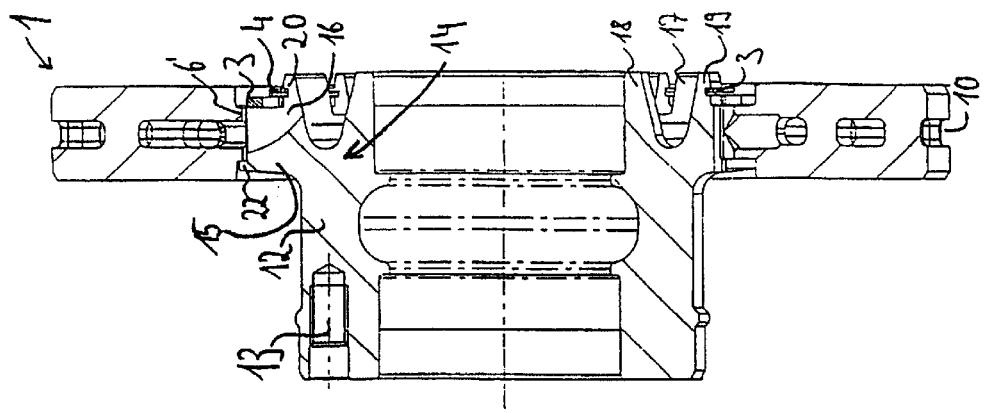

FIGS. 1 and 2 show a disk/hub connection having a brake disk 1, a wheel hub 2, a plurality of intermediate elements 3 and a securing ring 4. FIG. 3 differs therefrom essentially in that the wheel hub 2 is not constructed in one piece with the disk hub or is not also constructed as a disk hub but is designed to be slid onto a separate hollow-cylindrical wheel hub (not shown in FIG. 3), which, with respect to the manufacturing, can be advantageous in the case of different wheel hub constructions.

The internally ventilated brake disk 1 of FIG. 1, which is suitable particularly for heavy commercial vehicles with pneumatic disk brakes, has two friction rings 5, 6, which are connected with one another by way of links 7. Supporting elements 8 are molded onto the inner circumference of the brake disk 1. The supporting elements 8 project essentially trapezoidally from the inner circumference of the friction rings 5, 6 toward the interior and, for feeding cooling air into the interior of the brake disk 1, are provided with openings 9 which extend essentially radially through the supporting elements 8. The openings 9 permit the feeding of cooling air into the air gap 10 between the two friction rings 5, 6 and, toward the center of the brake disk, end in axial recesses 11 of the supporting elements 8. As a result, during the drive, cooling air can be supplied through the supporting elements 8 into the air gap 10 between the friction rings 5, 6. Between the supporting elements 8, the friction rings are axially stepped such that a type of step 6' is formed at the friction ring 6 for a contact against an axial securing element (see below) of the hub 2.

Figure 2C:
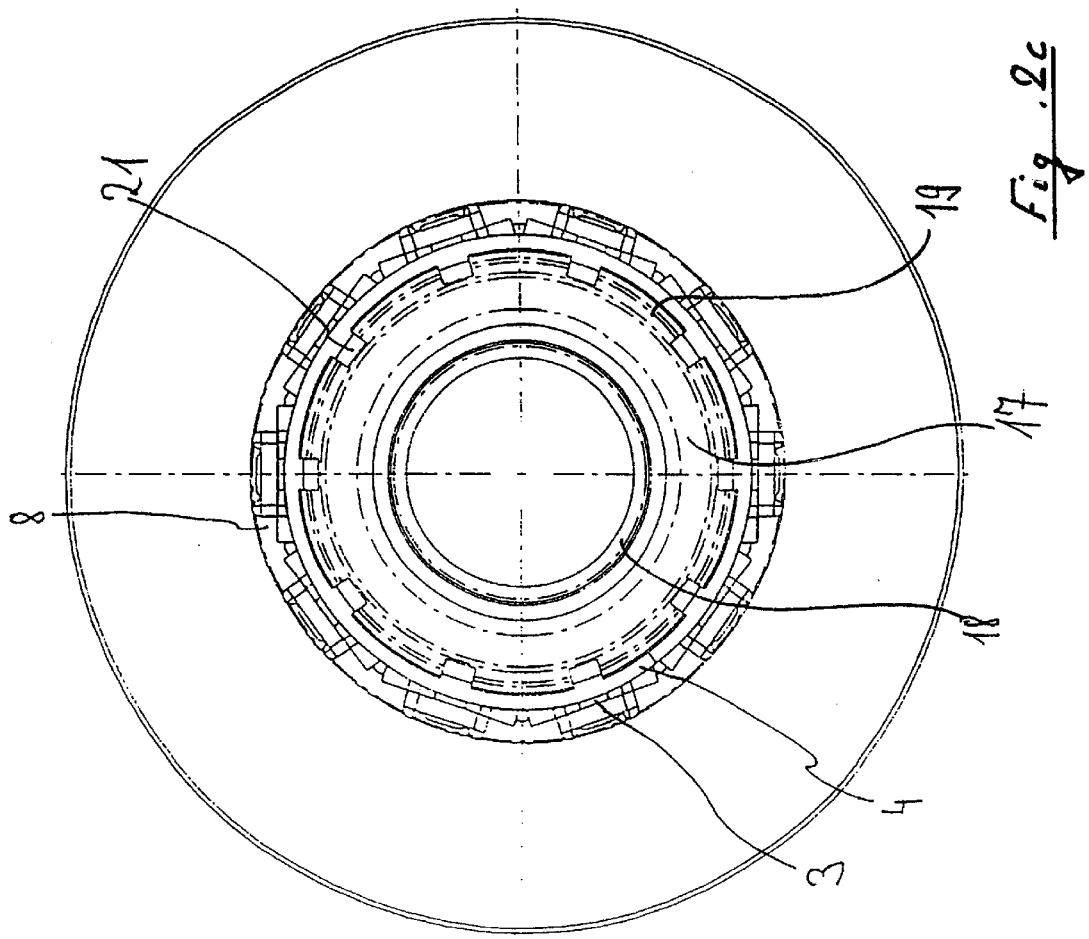

The wheel hub 2 of FIGS. 1 and 2 consists of a pot-shaped hollow-cylindrical section 12 (FIG. 2b) which, on one of its axial ends, has bores 13 provided with internal threads for studs (not shown here). The axial end of the hollow-cylindrical section 12 facing away from the bores 13 is adjoined by another axial hollow-cylindrical section 14, along whose outer circumference radially outward-projecting cams 15 are distributed.

In the top view of the outer circumference of the disk hub 2, the radially outward-extending cams 15 are U-shaped, an air duct 16 being constructed between the legs of the U, which air duct 16 extends from the radial exterior side of the cams 15 in a sloped manner to the radial line of the hub 2, the base leg of the U widening toward the hub interior. The air duct 16 ends in a surrounding recess 17 at the axial end of the hub 2 facing the brake disk 1. In this manner, a feeding of air can be implemented from the axial face of the hub 2 through the cams 15 into the air gap 10 of the brake disk (see FIG. 2).

The recess 17 on the face of the hub 2 is axially bounded toward the interior and toward the exterior in each case by a surrounding collar 18 and 19, the outer collar 19 being provided on its outer circumference with a surrounding ring groove 20. In the area of the cams 15 or—more precisely—of the air ducts 16, the surrounding collar 19 is provided with respective notches 21 corresponding to the air duct width, which are created in that the cams 15 as well as the air ducts 16 are formed in one piece from the material of the hub 2.

The clamp-type intermediate elements 3 have a U-shape or a base leg 23 and two longitudinal legs 24, 25 aligned perpendicularly thereto, the base leg 23 of the U being cut and formed in the center such that a first partial area 23a of the base leg 23 mutually connects the two longitudinal legs 24, 25 of the U, and in that two additional partial areas 23b,c project from the first partial area by 180° toward the outside.

As also shown particularly clearly in FIGS. 1 and 2b, the cams 15 of the hub 2 are in each case provided with a radially outward-projecting collar 22 which extends the base side of the U-shaped cam partially radially toward the outside. The purpose of using the collars 22 for axially securing the brake disk 1 on the hub 2 is illustrated in FIG. 2b, which is a sectional view along Line A—A of FIG. 2a, thus a cut which is placed through a cam 15 in the upper section of FIG. 2b and through a supporting element 8 in the lower section of this figure.

As illustrated by the interaction of FIGS. 1 and 2a–c, the brake disk 1 can be axially slid onto the brake disk hub (also called brake disk carrier), the cams 15 and the supporting elements 8 engaging in one another in the circumferential direction. The spaces 26 remaining between the cams 15 and the supporting elements 8 permit the lateral sliding of the intermediate elements 3 over the supporting elements 8 and thus a reliable torque transmission from the supporting elements 8 by way of the intermediate elements 3 to the cams 15 of the hub.

After the sliding of the brake disk 1 onto the cams 15 of the hub 2 and after the insertion of the intermediate elements 3, the securing ring 4 is placed in the ring groove 20, from which it projects axially toward the outside. The collars 22, which rest on inner projections 27 against the inner circumference of the disk, fix the brake disk in one axial direction. In the other axial direction, the brake disk 1 is fixed by the securing ring 4. A special advantage of this type of axial securing is the fact that no studs, which after a prolonged operation are difficult to unscrew or cannot be unscrewed at all, are required for fixing the brake disk on the hub.

Table of reference numbers brake disk 1
disk hub 2
intermediate elements 3
securing ring 4
friction rings 5, 6
links 7
supporting elements 8
openings 9
air gap 10
recesses 11
hollow-cylindrical section 12
bores 13
hollow-cylindrical section 14
cam 15
air duct 16
recess 17
collar 18
collar 19
ring groove 20
notches 21
collar 22
base leg 23
longitudinal legs 24, 25
spaces 26
inner projections 27

What is claimed is:

1. A disk and a hub connection for receiving a one-piece or multi-piece brake disk with friction rings connected by way of links on a hub, wherein the disk/hub connection for connecting the brake disk with the hub being such that
    a) the brake disk has supporting elements on an inner circumferential area;
    b) on an outer circumference, the hub is provided with cams;
    c) intermediate elements, which are arranged in a distributed manner in the circumferential direction, are arranged radially between the hub and the brake disk, which intermediate elements have a base section and at least one longitudinal section, which is constructed essentially perpendicular to the base section;
    d) the intermediate elements are placed over the cams or supporting elements, so that the longitudinal section projects into a space extending in the circumferential direction between the cams and the supporting elements to ensure a transmission of brake torque from the brake disk to the hub;

e) at least one of the cams of the hub having a radially outward-projecting shoulder, which axially secures toward one side the brake disk placed on the hub, the at least one shoulder being shaped in one piece on the axial end areas of the cams; and f) wherein on the inner circumference, the brake disk is axially stepped such that a step is created for resting on the shoulder.

2. Connection according to claim 1, wherein the axial fixing of the brake disk takes place toward the side of brake disk situated opposite the shoulder via a securing element, which is insertable into a groove of the hub.

3. Connection according to claim 2, wherein the securing element is an open ring, which is insertable into the groove and which projects radially toward the outside from the groove.

4. Connection according to claim 1, wherein the intermediate elements are constructed in the manner of clamps and are essentially U-shaped.

5. Connection according to claim 4, wherein the intermediate elements have a base leg as well as two longitudinal legs perpendicular thereto, which base leg is divided into several parts, a first part of the base leg mutually connecting the two longitudinal legs of the U-shape, two additional parts being bent by 180° toward the outside relative to the first partial area.

6. Connection according to claim 4, wherein the cams of the hub are provided with air ducts which, starting axially from the axial exterior sides of the cams, lead into an air duct of the brake disk.

7. Connection according to claim 6, wherein the air ducts are constructed as recesses which extend in a sloped manner to a brake disk plane, so that the cams form a type of "U" at the outer circumference, the base side of the U enlarging radially toward the inside.

8. Connection according to claim 3, wherein the cams of the hub are provided with air ducts which, starting axially from the axial exterior sides of the cams, lead into an air duct of the brake disk.

9. Connection according to claim 2, wherein the intermediate elements are constructed in the manner of clamps and are essentially U-shaped.

10. The connection according to claim 1, wherein the hub is at least one of a wheel hub and brake disk hub.

11. A hub and brake disk arrangement, comprising:

a brake disk having supporting elements on an inner circumferential area;

a hub having cams arranged on an outer circumferential area, at least one of said cams having a radially outward-projecting shoulder shaped in one-piece on axial end areas of the cam, said supporting elements of the brake disk engaging in a toothed manner the cams of the hub when the brake disk is placed on the hub;

intermediate elements arranged in a distributed manner in a circumferential direction radially between the hub and the brake disk;

wherein on the inner circumferential area of the brake disk, an axially stepped surface is provided which rests on the radially outward-projecting shoulder of the at least one cam.

12. The arrangement according to claim 11, further comprising a securing element insertable into a groove of the hub to axially fix the brake disk on the hub.

13. The arrangement according to claim 11, wherein the intermediate elements each comprise a base section and at least one longitudinal section, with which longitudinal section projects into a space formed between a respective cam and supporting element.

14. The arrangement according to claim 11, wherein each intermediate element has a substantially U-shape including a base section and two longitudinal sections, which longitudinal sections are constructed essentially perpendicular to the base section and each project into a respective space formed between a respective cam and supporting element.

* * * * *